(12) United States Patent
Jonasson et al.

(10) Patent No.: US 10,421,474 B2
(45) Date of Patent: Sep. 24, 2019

(54) LIFT-TRUCK WITH AUTOMATED CLIMBING FUNCTION

(71) Applicant: Toyota Material Handling Manufacturing Sweden AB, Mjölby (SE)

(72) Inventors: Mikael Jonasson, Oskarshamn (SE); Markus Karlsson, Linköping (SE)

(73) Assignee: Toyota Material Handling Manufacturing Sweden AB, Mjölby (SE)

(*) Notice: Subject to any disclaimer, the term of this patent is extended or adjusted under 35 U.S.C. 154(b) by 0 days.

(21) Appl. No.: 15/610,045

(22) Filed: May 31, 2017

(65) Prior Publication Data

US 2017/0349197 A1 Dec. 7, 2017

(30) Foreign Application Priority Data

Jun. 2, 2016 (EP) .................................... 16172674

(51) Int. Cl.
*B62B 3/06* (2006.01)
*B62B 5/00* (2006.01)
*B66F 5/02* (2006.01)

(52) U.S. Cl.
CPC .............. *B62B 3/06* (2013.01); *B62B 3/0612* (2013.01); *B62B 5/0069* (2013.01); *B66F 5/02* (2013.01);
(Continued)

(58) Field of Classification Search
CPC ....... B62B 3/06; B62B 3/0612; B62B 5/0069; B62B 2203/24; B62B 2203/28;
(Continued)

(56) References Cited

U.S. PATENT DOCUMENTS 2,178,647 A * 11/1939 Raymond ................ B62B 3/06
254/2 C
2,550,548 A * 4/1951 Framhein ................ B62B 3/06
254/10 C
(Continued)

FOREIGN PATENT DOCUMENTS

CN 106671906 B * 11/2017
DE 20 2009 011802 U1 6/2010
(Continued)

OTHER PUBLICATIONS

The extended search report from the European Patent Office, dated Dec. 20, 2016, 5 Pages, for European Patent Application No. 16172674.0.

*Primary Examiner* — Glenn F Myers
(74) *Attorney, Agent, or Firm* — Quarles & Brady LLP

(57) ABSTRACT

A lift-truck having a height adjustable load engagement means and a lifting/lowering unit and a support wheel and a climbing wheel and comprising a detection sensor arranged to detect a pallet located in front of the load engagement means and in a control unit to control the lifting/lowering unit, in response to a signal indicative of a detected pallet, to move the load engagement means to place the climbing wheel at a first predetermined height over the ground surface and, control the lifting/lowering unit to lower the load engagement means to place the climbing wheel at a second predetermined height over the ground surface when an operational parameter, indicative of movement of the lift-truck, equals a predetermined value.

13 Claims, 6 Drawing Sheets

(52) U.S. Cl.
CPC ....... *B62B 2203/24* (2013.01); *B62B 2203/28* (2013.01)

(58) Field of Classification Search
CPC .......... B62B 2206/06; B66F 5/02; B66F 9/16; B66F 9/065
See application file for complete search history.

(56) References Cited

U.S. PATENT DOCUMENTS 4,747,610 A * 5/1988 Yingling ............... B62B 3/0612
180/271
6,490,227 B2 * 12/2002 Nagai ....................... B66F 9/20
367/99

FOREIGN PATENT DOCUMENTS

| GB | 2123787 A * | 2/1984 | ............... B62B 3/06 |
|----|-------------|--------|--------------------------|
| GB | 2 137 161 A | 10/1984 | |
| GB | 2385312 A * | 8/2003 | ............... B62B 3/06 |
| WO | 2012/158531 A1 | 11/2012 | |

\* cited by examiner

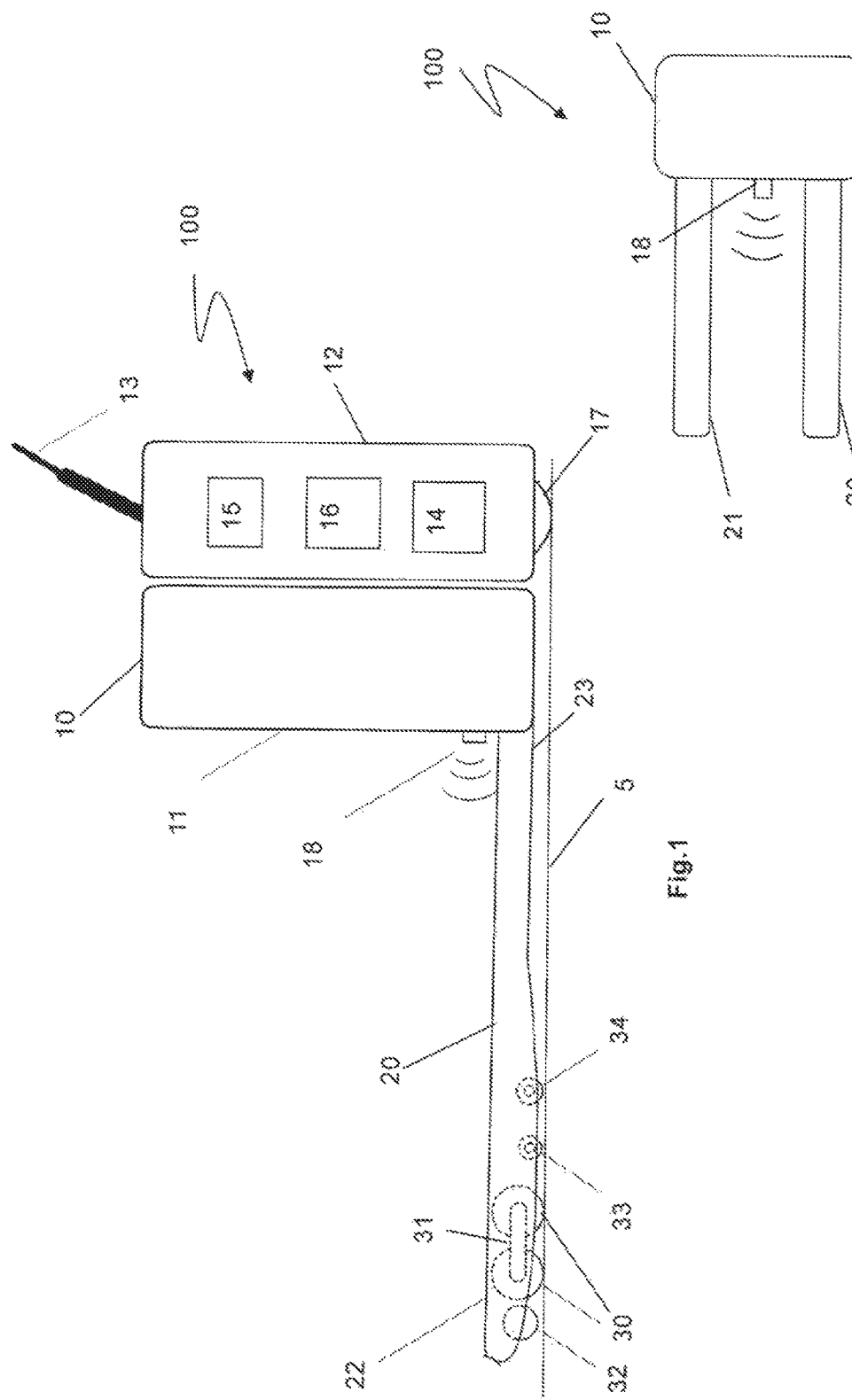

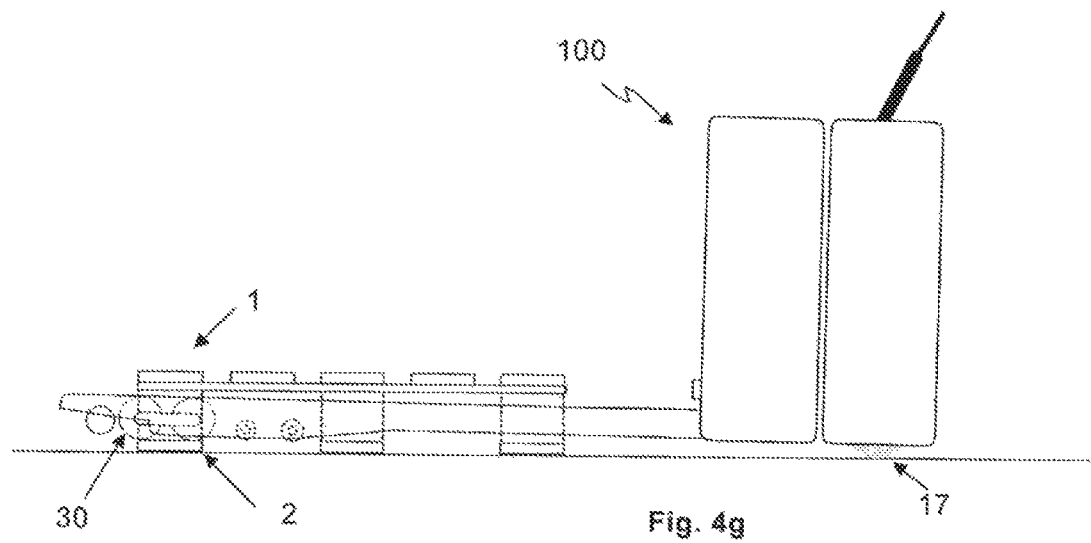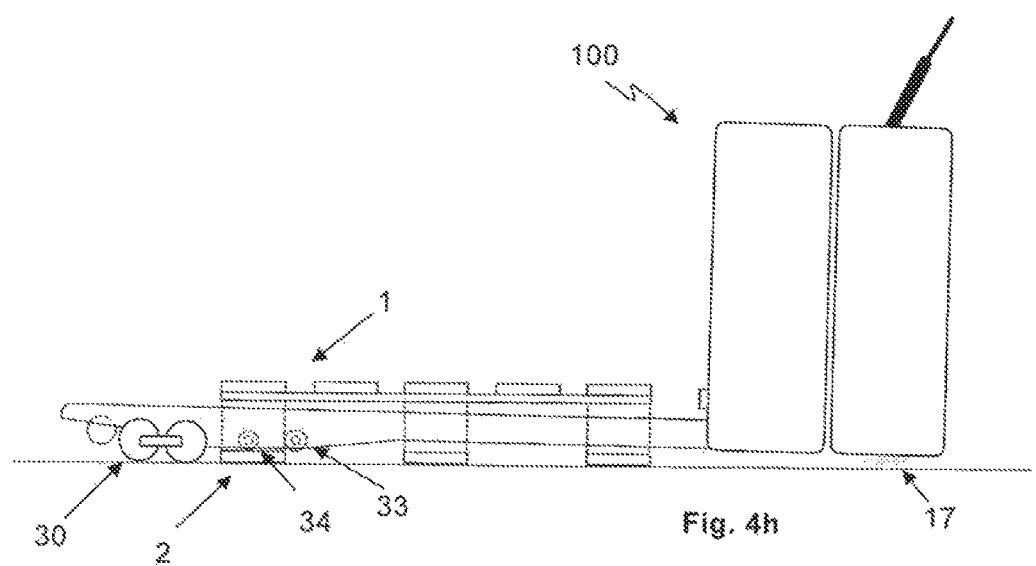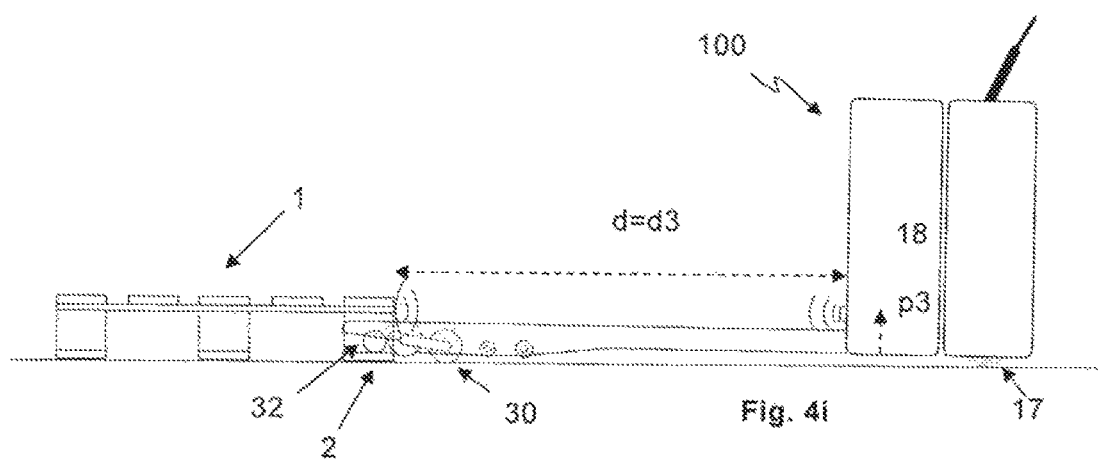

LIFT-TRUCK WITH AUTOMATED CLIMBING FUNCTION

CROSS-REFERENCE TO RELATED APPLICATIONS

This application claims the priority benefit of European Patent Application No. 16172674.0 filed Jun. 2, 2016, the contents of which is hereby incorporated by reference as if set forth in its entirety.

TECHNICAL FIELD

The present disclosure relates to a lift-truck having load engagement means supported by support wheels wherein the load engagement means comprises climbing wheels for assisting the support wheels in rolling up onto a base board of a pallet.

BACKGROUND ART

Powered Low Lifting Fork-Lift Trucks or Powered Pallet Trucks comprise a height adjustable fork which is supported on the ground by front support wheels. These trucks are typically used for moving loading pallets in warehouses. Such pallets are supported on the ground by lower base boards which are arranged parallel and form two channel-like openings for receiving the forks of the pallet truck. Sometimes, it is not possible to maneuver the truck into a position where the forks may be inserted into the appropriate channels of the pallet and instead the pallet is engaged in a direction transverse to the base boards. A problem related to this maneuver is that the pallet may be pushed away from the truck when the support wheels hit the base board of the pallet. A further problem is that shocks and loud noises may be caused when the support wheels of the truck hit the base board of the pallet and the ground surface while climbing up and down the base boards of a pallet.

To minimize these problems, a climbing wheel may be arranged in front of the support wheel on the forks of the pallet truck.

GB2137161 shows a pallet truck having tandem climbing wheels which are pivotally suspended on the tip of the forks of the pallet truck. In operation, the climbing wheels roll up on the baseboard and bear down thereon so that the pallet is held in place when the larger support wheel engages the base board.

However, it is still necessary to engage the pallet at a relatively high speed to force the support wheels upon and over the base board. In addition thereto, the known climbing wheel arrangement is of relatively complicated construction and limited to a narrow range of pallet dimensions.

Thus, it is an object of the present disclosure to provide a lift-truck which solves or at least mitigates one of the problems of the prior-art. A further object of the present disclosure is to provide a fork-lift truck which provides for a smooth traversal of the support wheels over a base board. Yet a further object of the present disclosure is to provide a fork-lift truck having a flexible climbing function. Yet a further object of the present disclosure is to provide a simple and cost effective fork-lift truck with automated climbing function.

SUMMARY OF THE INVENTION

According to a first aspect of the present disclosure at least one of the aforementioned objects is met by a lift-truck comprising a first and a second height adjustable load engagement means and a lifting/lowering unit arranged to raise or lower the load engagement means, wherein each load engagement means has a forward end and comprises at least one support wheel for supporting the load engagement means on a ground surface and a climbing wheel for assisting the support wheel to roll up on a base board of a pallet, a detection sensor arranged to detect a pallet located in front of the climbing wheel and in a control unit connected to the lifting/lowering unit and to the detection sensor, wherein the control unit is configured to:

- in response to a signal d from the detection sensor, indicative of a detected pallet, control the lifting/lowering unit to move the load engagement means to place the climbing wheel at a first predetermined height $h1$ over the ground surface and;
- determine at least one operational parameter op indicative of a movement of the lift-truck and;
- control the lifting/lowering unit to lower the load engagement means to place the climbing wheel at a second predetermined height $h2$ over the ground surface when the operational parameter op equals a predetermined operational value ov.

In operation, the detection sensor detects a pallet standing on the ground in front of the lift-truck. The control unit may, in response to a signal from the detection sensor indicative of a detected pallet, automatically raise and lower the load engagement means such that the climbing wheels firstly are raised above the base board of the pallet and subsequently are set down onto the base board of the pallet. When the climbing wheels are resting on the upper surface of the base board, substantially all weight of the lift-truck will be taken by the climbing wheels and the rear drive wheel of the lift-truck. This in turn will allow the support wheels to, smoothly and without shocks, roll up onto the base board when the lift-truck continues to drive forward.

The detection sensor may be a distance sensor, such as a sonic distance sensor. The distance sensor is a reliable means for detecting a pallet in front of the lift-truck and accurately determining the distance between the lift-truck and the pallet.

According to one alternative, the operational parameter op is the traveled distance of the lift-truck after detection of a pallet. This parameter may easily be retrieved from the control unit of the lift-truck and provides a good estimation of the correct time to lower the load engagement means in order to place the climbing wheels on the base board of the pallet. The operational parameter may also be a combination of traveled time and the velocity of the lift-truck after detection of a pallet. For example a value calculated on the basis of these parameters. Traveled time and velocity of the lift-truck may easily be retrieved from the control unit and the control unit may also be configured to perform calculations on the basis of these parameters.

According to another alternative, the operational parameter op is a distance measured by the detection sensor. It may be advantageous to use distance measurement from the detection sensor since movement of the load engagement means thereby may be performed with high accuracy.

Typically, the first predetermined height $h1$ is greater than the thickness of the base board of a preselected pallet type. This will ensure that the climbing wheels may be placed above the upper surface of the base board of the pallet without contacting the edges of the base board and causing resulting shocks.

Typically, the second predetermined height $h2$ is equal to or less than the thickness of the base board of a preselected pallet type. The climbing wheel may thereby be set onto the upper surface of the base board and take a substantial portion of the weight of the lift-truck.

The lift-truck may comprise a housing having a front and the load engagement means may extend from the front of the housing. The detection sensor may be arranged on the front of the housing. The detection sensor may thereby easily be directed towards an area in front of the load engagement means.

The load engagement means may be spaced apart and the detection sensor may be arranged between the load engagement means. This is a suitable position to ensure that the detection sensor has a free line of sight and at all times may detect a pallet in front of the forward end of the load engagement means.

According to an alternative, the detection sensor is arranged in the front end of at least one of the load engagement means.

Each load engagement means may comprise at least a first auxiliary wheel arranged between the support wheel and a rear end of the load engagement means. The auxiliary wheel will support the load engagement means on the upper surface of the base board as the truck moves forward and the climbing wheels, or the support wheels are out of contact with the base board.

BRIEF DESCRIPTION OF THE DRAWINGS

FIG. 1: A schematic side view drawing of a lift-truck according to a first embodiment of the present disclosure.

FIG. 2: A schematic drawing from above of a lift-truck according to the first embodiment of the present disclosure.

FIG. 4a-4i: Schematic drawings of a lift-truck according to the first embodiment of the present disclosure during transverse engagement with a pallet.

DETAILED DESCRIPTION OF EMBODIMENTS

Figure 3:
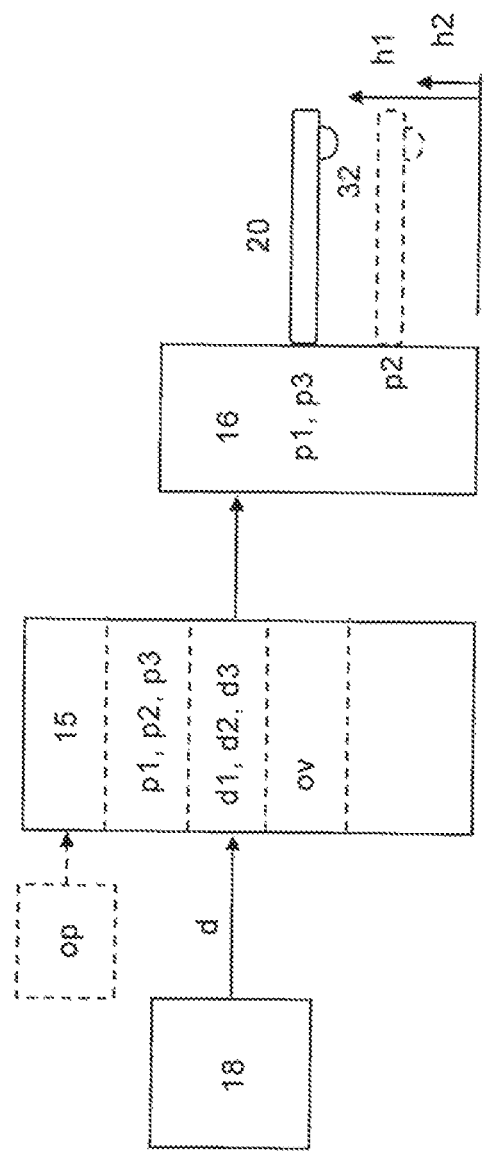
FIG. 3: A flowchart showing the function of the lift-truck according to the disclosure.

The lift-truck according to the present disclosure will now be described more fully hereinafter. The lift-truck according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Same reference numbers refer to same elements throughout the description.

FIG. 1 shows schematically a lift-truck 100 according to a first embodiment of the present disclosure in side view. FIG. 2 shows the lift-truck 100 in a view from above. The lift-truck 100 is typically a fork-lift truck, such as a powered pallet truck, powered stacker truck or low lifting order picking trucks. The lift-truck 100 comprises a first and a second vertically movable load engagement means 20, 21 in the form of a first and a second lifting fork arm. The lift-truck 100 further comprises a housing 10 having a front 11 and a rear 12. A drive wheel 17 is arranged underneath the housing 10. The housing comprises a lifting/lowering unit 16 for raising or lowering the load engagement means 20, 21. For example, the lifting/lowering unit 16 is a hydraulic piston/cylinder arrangement. The housing 10 further comprises an electric motor 14 for propelling the drive wheel 17 of the lift-truck. The housing further comprises an Electronic Control Unit (ECU) 15, for example a Programmable Logic Controller, which is configurable to control the motor 14 and the lifting/lowering unit 16 and other functions of the lift-truck. The lift-truck further comprises an operator's control 13 arranged on the housing 10 and other components (not shown) such as an electric battery and electrical wiring, electronic circuits and hydraulic components as is known to the skilled person.

The load engagement means 20, 21 extend from the front 11 of the housing 10 and each comprises at least one support wheel 30 for supporting the respective load engagement means 20, 21 on the ground surface 5 that the lift-truck 100 is running on. In the described embodiment, each load engagement means 20, 21 comprises a bogie 31 having a first and a second support wheel 30. The support wheels, i.e. the bogie 31, are attached in a known manner, by a linkage (not shown), to the load engagement means 20, 21 such that the support wheels 30 remain in contact with the ground surface 5 when the load engagement means 20, 21 are raised. Instead of a bogie 31, each load engagement means 20, 21 may comprise a single support wheel (not shown). Each load engagement means 20, 21 further comprises a climbing wheel 32 which is arranged in front of the support wheels 30, i.e. between the support wheels 30 and the forward end 22 of the load engagement means 20, 21. The load engagement means 20, 21 further comprises a first and a second auxiliary wheel 33, 34 which are arranged behind the support wheels 30, i.e. between the support wheels 30 and the rear end 23 of the load engagement means 20, 21. The climbing wheel 32, and the auxiliary wheels 33, 34 are rotationally attached to shafts (not shown) to the lower side of the load engagement means 20, 21 and out of contact with the ground surface 5.

Figure 4A:
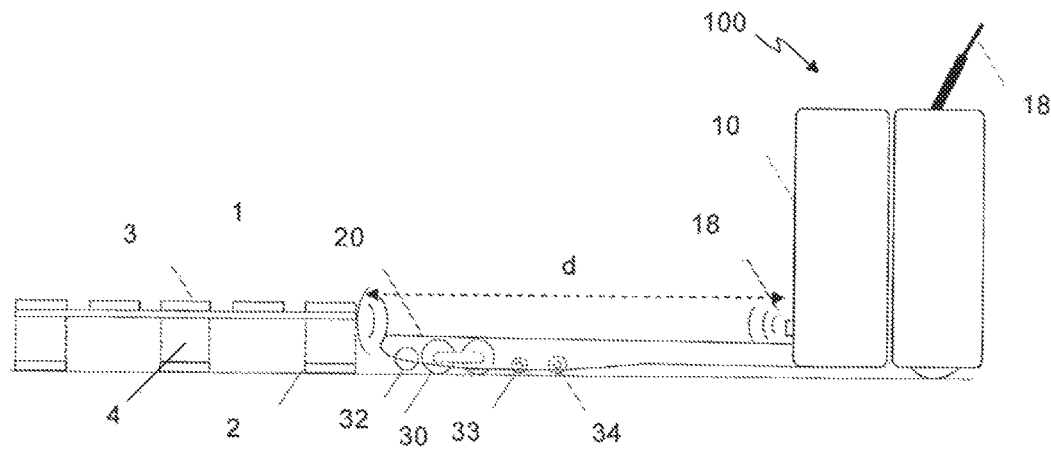

According to the disclosure, the lift-truck 100 comprises a detection sensor 18 which is arranged to detect a pallet 1 located on the ground surface 5 in front of the climbing wheels 32 (the pallet 1 is shown in FIG. 4a). The detection sensor 18 may be a distance sensor, or may be a contact-less distance sensor. A distance sensor is configured to detect and measure the distance to an object. Examples of such distance sensors are a laser distance sensor or a sonic distance sensor, such as an ultrasonic distance sensor. An example of a laser distance sensor is VDM28-8-L-IO/73c/110/122 commercially available by the company Pepperl+Fuchs group. An example of a sonic distance sensor is HC-SR04 commercially available by the company Kjell & Co AB.

However, the detection sensor 18 may also be configured to solely detect the presence of a pallet in front of the climbing wheels of the lift-truck. Examples of this type of detection sensors, also known as presence sensors are: inductive sensors or capacitive sensors or magnetic sensors or optical sensors, such as cameras.

The detection sensor 18 may be arranged on the exterior side of the front 11 of the housing 10. As shown in FIG. 2, the detection sensor 18 may be arranged between load engagement means 20, 21, which are spaced apart. This position may be advantageous since the sensor 18 has a free line of sight in the space between the load engagement means 20, 21. Another possible position of the sensor 18 is in the forward end 22 of one or both of the load engagement means 20, 21 (see FIG. 5a).

The general function of the lift-truck 100 of the present disclosure will hereinafter be described with reference to the flowchart of FIG. 3.

The detection sensor 18 is connected, e.g. electrically connected, to the control unit 15 of the lift-truck 100 and transmits signals, e.g. electrical signals, to the control unit 15 indicative of the presence of a detected pallet in the sensing area of the sensor. The signal from the sensor may also include the measured distance d to a detected pallet in the sensing area of the sensor.

The control unit 15 is accordingly configured to receive the signals d from the detection sensor 18.

The control unit 15 is further configured with at least a first and a second predetermined vertical position p1, p2 for the load engagement means 20, 21.

The first predetermined vertical position p1 of the load engagement means 20, 21 may be selected such that the climbing wheel 32 is at a first predetermined height h1 over the ground which is greater than the thickness of the base board of a preselected pallet type. The second predetermined vertical position p2 of the load engagement means 20, 21 may be selected such that the climbing wheel 32 is at a second predetermined height h2 over the ground which is equal to or less than the thickness of the base board of a preselected pallet type.

The control unit 15 is configured to, in response to a signal from the detection sensor indicative of the presence of a pallet in front of the climbing wheels of the lift-truck, control the lifting/lowering unit 16 to move the load engagement means 20, 21 to the first predetermined vertical position p1. The climbing wheel 32 is thereby placed at a first predetermined height h1 over the ground surface 5.

According to one alternative, the signal from the detection sensor indicates merely the presence of a pallet in the sensing area of the sensor. For example, the signal from the sensor is digital and changes from a first state to a second state when a pallet enters the sensing area of the sensor and is detected. In this case, the control unit is configured to move the load engagement means 20, 21 to a first predetermined vertical position p1 when the signal from the detection sensor changes state.

According to a second alternative, the detection sensor 18 is a distance sensor and the signal from the sensor is therefore indicative of the distance d to a pallet in front of the climbing wheel 30 of the lift-truck. The control unit 15 may therefore be configured with at least a first predetermined distance d1 and further configured to compare the measured distance d from the sensor 18 to a pallet 1 with the predetermined distances d1. The control unit is further configured to control the lifting/lowering unit 16 to move the load engagement means 20, 21 to a first predetermined vertical position p1 when the measured distance d to a pallet is equal to a first predetermined distance d1. The climbing wheel 32 is thereby placed at a first predetermined height h1 over the ground surface 5.

The next operation, after moving the load engagement means to first vertical position p1, it is determined whether the lift-truck has moved sufficiently towards the pallet so that the climbing wheels may be placed onto the base board of the pallet.

The control unit 15 may therefore be configured to determine an operational parameter op indicative of a movement of the truck and to compare the operational parameter op with a predetermined operational value ov. The control unit 15 is further configured to control the lifting/lowering unit 16 to lower the load engagement means 20, 22 to the second predetermined position p2 when the determined operational parameter op is equal to the predetermined operational value ov. The climbing wheel 32 is thereby placed at a second predetermined height h2 over the ground surface 5.

According to one alternative, the operational parameter op is the traveled distance of the lift-truck after detection of a pallet. However, the operational parameter op may also be a calculated value on basis of e.g. the travelling time and the velocity of the lift-truck after detection of a pallet. Traveled distance, traveled time and the velocity of the lift-truck can be retrieved from the control unit.

According to another alternative, in the case where the detection sensor 18 is a distance sensor, the operational parameter op is a measured distance d from the detection sensor.

The control unit 15 may thereby be configured with at least a second predetermined distance d2 and is further configured to compare the measured distance d from the sensor 18 to a pallet 1 with the predetermined distances d2. The control unit 15 is further configured to control the lifting/lowering unit 16 to move the load engagement means 20, 21 to the second predetermined vertical position p2 when the measured distance d to a pallet is equal to the second predetermined distance d2. The climbing wheel 32 is thereby placed at a second predetermined height h2 over the ground surface 5.

The predetermined distances d1, d2, the predetermined operational value vp and the predetermined vertical positions p1, p2 may be stored in a memory of the control unit 15. As will be described with reference to FIG. 4i, the control unit may be configured with a third predetermined distance d3 and a third predetermined vertical position p3 of the load engagement means.

It is appreciated that that the lift-truck is travelling towards a pallet during the above described procedure.

The load engagement means 20, 21 are raised, respectively lowered, to the predetermined vertical position p1, p2 by running the lifting/lowering unit 16 for a predetermined time.

The predetermined distances d1, d2, the predetermined operational value ov and the predetermined positions p1, p2 of the load engagement means 20, 21 are selected in dependency of the dimensions of a base board 2 of a preselected, i.e. specific, pallet type. They may also include factors such as dimensions and positions of the climbing wheel 32, the dimensions of the load engagement means 20, 21 and the position of the distance sensor 18.

Figure 4B:
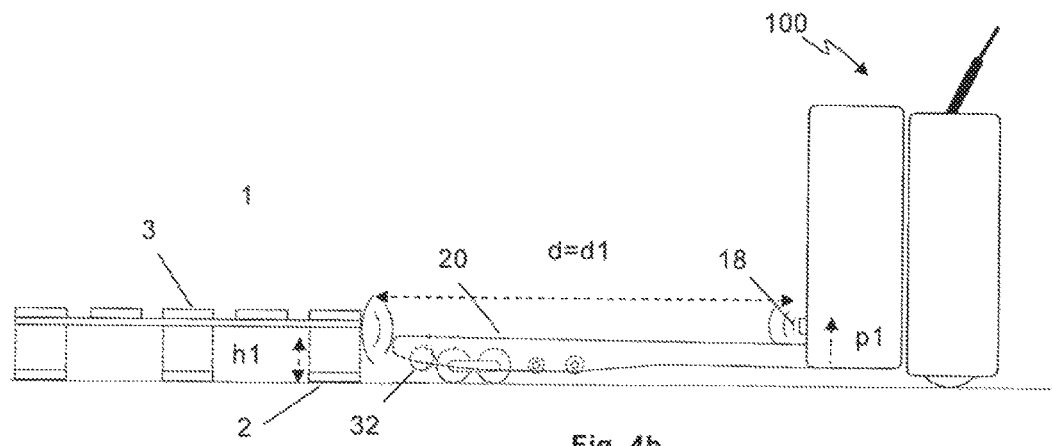
Figure 4C:
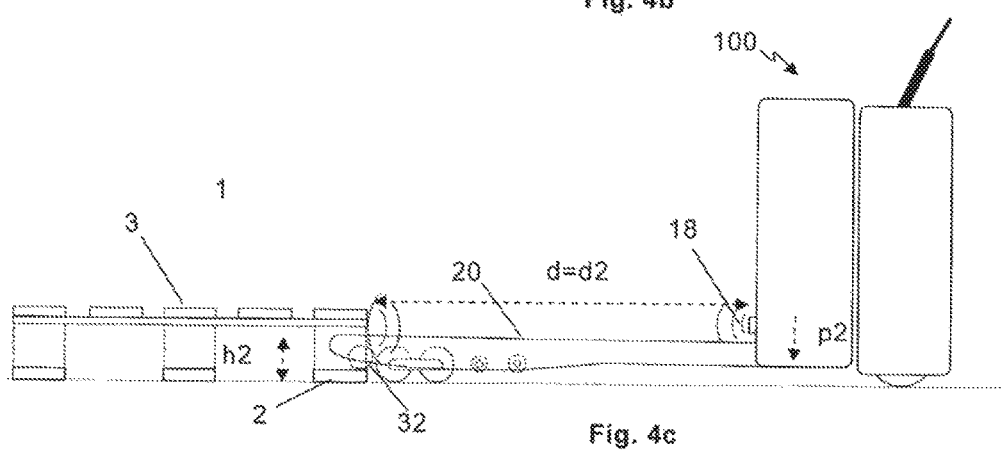

The predetermined distance d1 is selected such that the climbing wheels 32 are proximate to the pallet. That is, the climbing wheels 30, or the front end 22 of the load engagement means 20, 21 is close to, but not engaging, the pallet. The predetermined operational value ov or the second predetermined distance d2 are selected such that the climbing wheel 30 is at a position above the upper surface of the base board of the pallet. The second predetermined distance d2 is thereby less than the first predetermined distance d1. The predetermined distances d1, d2 are shown in FIGS. 4b and 4c.

When the detection sensor 18 is configured to solely detect a pallet, the detection sensor 18 may be arranged such that the pallet is detected when the climbing wheel 32 is proximate to the pallet.

The predetermined distances d1, d2, the predetermined operational value ov as well as the predetermined vertical positions p1, p2 of the load engagement means 20, 21 may be determined by measurements on preselected pallets types. One type of a preselected pallet is a CHEP-pallet which has the dimensions 1000×1200 mm and in which the baseboard is 100 mm wide and has a height of 25 mm. Another type of a preselected pallet is a EUR-pallet which has the dimensions 1200×800 mm and in which the baseboard is 100 mm or 145 mm wide and has a height of 22 mm. Configuration of the control unit 15 may be performed by the skilled person.

It is of course possible to configure the control unit 15 with further predetermined distances d1, d2, predetermined operational values ov and predetermined positions p1, p2 of the load engagement means 20, 21 for more than one selected pallet type. The operator's control 13 may then be provided with a selector example a knob (not shown) which is connected to the control unit and configured to select a pallet type.

The detection of a pallet and the distance measurements may be performed continuously and the control unit 15 may be configured to continuously compare the measured distances from the sensor with the predetermined distances p1, p2 and controlling the lifting/lowering unit 16 to move the load engagement means 20, 21.

The operator's control 13 may comprise an activator (not shown), such as a press-button, which is connected to the control unit 15. The control unit may be configured such that actuation of the activator starts the distance measurement and the subsequent comparing of measured distances with predetermined distances p1, p2, and controlling of the lifting/lowering unit 16. A selective activation of the automated height adjustment of the load engagement means is advantageous since it results in lower energy consumption of the lift-truck compared to a situation where distance measurements are performed continuously.

The operation of a lift-truck 100 according to a first embodiment of the present disclosure will be described with reference to FIGS. 4a-4i.

FIG. 4a shows a lift-truck 100 according to the present disclosure which is approaching a pallet 1 having an upper surface 3 and three base boards 2 that are spaced apart from the upper surface 3 by distance blocks 4. The lift-truck 100 is approaching the pallet 1 in a direction traverse to the base boards 2 of the pallet. The detection sensor 18 which may be a distance sensor, measures the distance d to the pallet and transmits the measured distance d to the control unit 15 which compares it with the stored predetermined distances d1, d2.

FIG. 4b shows the lift-truck 100 in a position where it has approached closer to the pallet 1 such that the measured distance d from the sensor 18 to the pallet 1 is equal to the predetermined distance d1. The control unit 15 therefore controls the lifting/lowering unit 16 to raise the load engagement means 20, 21 to a predetermined vertical position p1. The climbing wheel 32 is thereby placed at a predetermined height h1 above the ground which is greater than the thickness of the base board 2. As shown in FIG. 3b, the predetermined vertical position p1 of the load engagement means 20, 21 is selected such that the load engagement means 20, 21 may enter underneath the upper surface 3 of the pallet.

FIG. 4c shows the lift-truck 100 in a position where it has approached closer to the pallet 1 such that the measured distance d from the sensor 18 to the pallet 1 is equal to the predetermined distance d2. In this position, the forward end 22 of the load engagement means 20, 21 has entered in the space between the upper surface 3 and the base board 2 of the pallet 1 such that the climbing wheel 32 is above the base board 2. The control unit 15 determines that the measured distance d is equal to the predetermined distance d2 and controls the lifting/lowering unit 16 to lower the load engagement means 20, 21 to a predetermined position p2. The climbing wheel 32 is thereby placed at a predetermined height h2 above the ground which is equal to the thickness of the base board 2. As shown in FIG. 4c the climbing wheel 32 is resting on the base board 2 of the pallet. In this position, essentially all the weight of the lift-truck 100 is distributed between the climbing wheel 32 and the drive wheel 17 of the lift-truck.

Figure 4D:
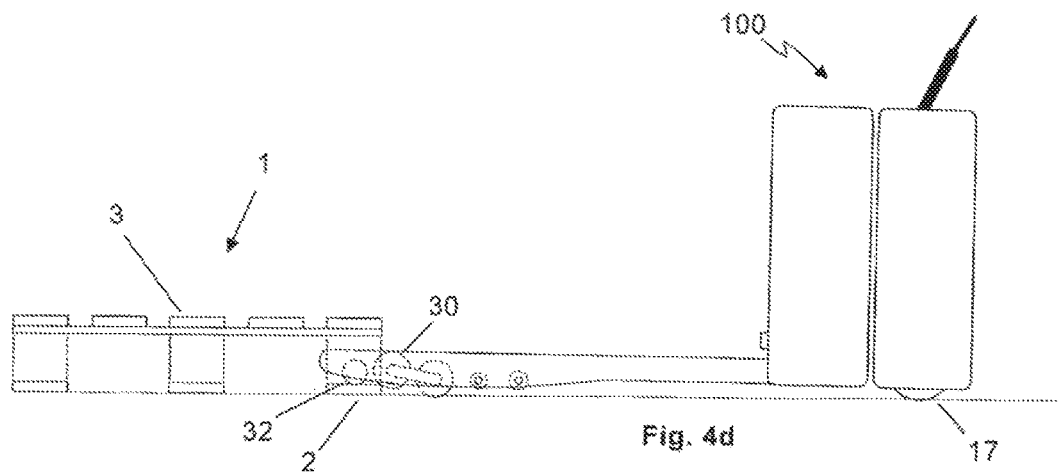

FIG. 4d shows the lift-truck 100 in a position where it has approached closer to the pallet 1 and the support wheels 30 start to roll up onto the first base board 2 of the pallet 1. Since substantially no weight is acting on the support wheels 30, the support wheel 30 rolls easily up on the base board 2.

Figure 4E:
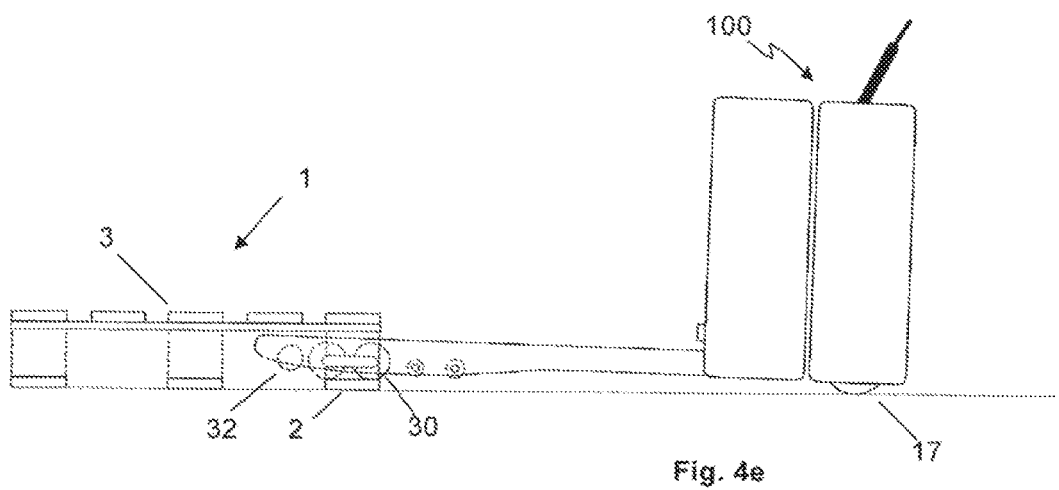

FIG. 4e shows the lift truck 100 in a position in which it has approached closer to the pallet 1 and in which the support wheels 30 are rolling over the first base board 2.

Figure 4F:
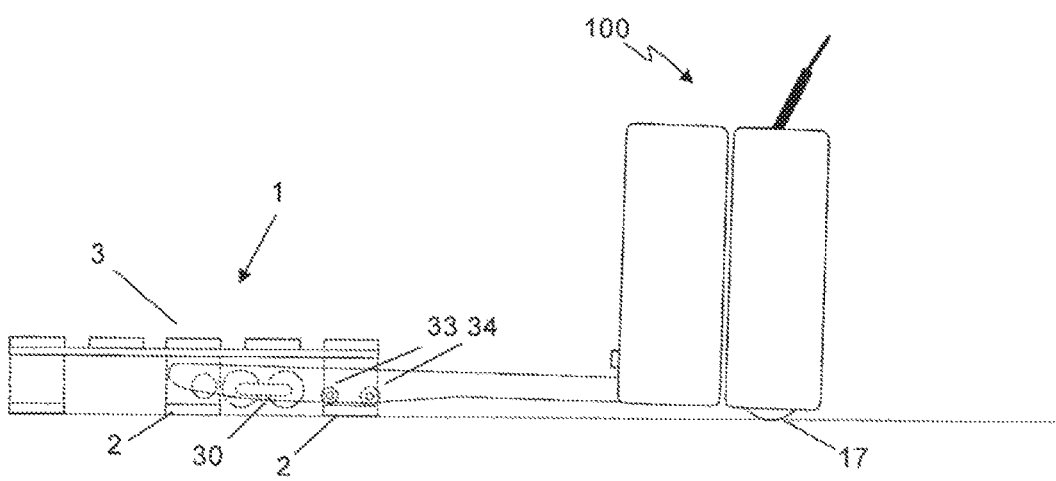

FIG. 4f shows the lift-truck 100 in a position where it has approached closer to the pallet 1 and the support wheels 30 has left the first base board 2. In this position the auxiliary wheels 33, 34 has entered the first base board 2 and the weight of the lift-truck is therefore distributed between the auxiliary wheels 33, 34 and the drive wheel 17 of the lift-truck. Therefore, the support wheels 30 may smoothly roll up on the middle base board 2 of the pallet 1.

The process of shifting the weight distribution of the truck between support wheels and the auxiliary wheels continues as the load engagement means 20, 21 are moved through the pallet 1 and the support wheels 30 are standing on the ground surface.

FIG. 4g shows the lift-truck 100 in a position where it has approached closer to the pallet 1 and the support wheels 30 and the auxiliary wheels 33, 34 has rolled over the middle base board such that the support wheels 30 are rolling over the last base board 2 of the pallet 1.

FIG. 4h shows the lift-truck in a position where the support wheels 30 have left the last base board 2 of the pallet 1 and are standing on the ground surface. In this position the load engagement means 20 may be raised to lift the pallet 1 above the ground surface in order to transport it to a new location.

When the lift-truck leaves the pallet 1, the load engagement means may be lowered until the auxiliary wheels rest upon the base board of the pallet as shown in 4h. This may be executed manually or automatically. Retraction of the load engagement means 20 is thereafter executed as shown in FIGS. 4e-4h, but in reverse order, until the support wheel 30 leaves the first base board.

FIG. 4i shows a situation where the support wheels 30 have started to roll down from the last base board 2 of the pallet 1. In this position, the weight of the lift-truck 100 is distributed between the climbing wheel 32 and the drive wheel 17. When the truck continues to move away it may be desirable to avoid a sudden shock as the climbing wheel 30 leaves the base board 2 and the weight of the lift truck is taken by the support wheels 30. Therefore the measured distance d from the detection sensor 18 may be compared with a third predetermined distance d3 in the control unit 15 of the lift truck. The third predetermined distance d3 may be equal to the first predetermined distance d1 and is selected in view of a preselected pallet type such that climbing wheel is within the limits of the base board 2 and the support wheels 30 are on the ground surface.

When the control unit determines that the measured distance d is equal to the third predetermined distance d3 it controls the lifting/lowering unit 16 of the lift-truck to raise the load engagement means to a third predetermined vertical position p3 such that the climbing wheel moves out of contact with the base board 2. The entire weight of the lift-truck is then distributed between the support wheels 30 and the drive wheel 17 and the truck may smoothly move away from the pallet 1. The third vertical position p3 may be equal to the first vertical position p1.

The operation of a lift-truck 100 according to a second embodiment of the present disclosure will in the following be described with reference to FIGS. 5a and 5b.

Figure 5A:
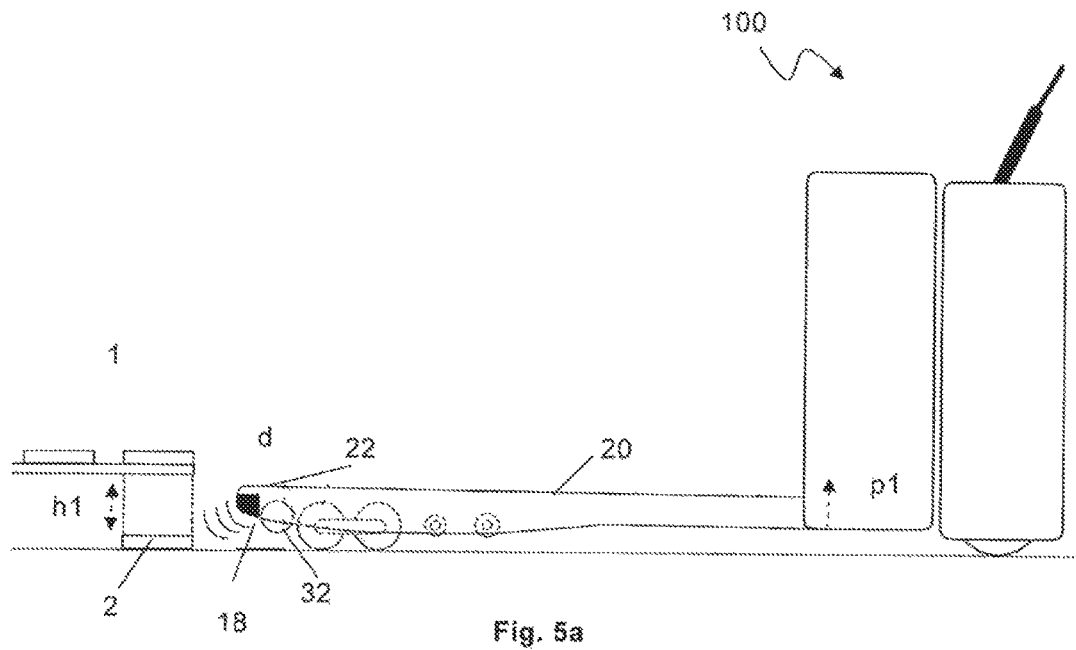
FIG. 5a, 5b: Schematic drawings of a lift-truck according to a second embodiment of the present disclosure during transverse engagement with a pallet.

FIG. 5a shows a lift-truck 100 according to the present disclosure which is approaching a pallet 1 in direction traverse to the base boards 2 of the pallet. The lift-truck has a detection sensor 18, in the form of a distance sensor which is configured to measure the distance d to a pallet in the front of the climbing wheel 32 on the load engagement means 20. However, the detection sensor 18 may alternatively be a presence sensor which is arranged to detect the presence of a pallet in front of the climbing wheel 32 on the load engagement means 20. Other features of the lift-truck are the same as described under FIGS. 1 and 4a. The lift-truck 100 is in a position close to the pallet 1 and therefore the base board 2 of the pallet is in the sensing area of the detection sensor 18.

The control unit 15 receives a detection signal d from the detection sensor indicative of the presence of a pallet in front of the climbing wheels 32 of the lift-truck. In response thereto the control unit 15 controls the lifting/lowering unit 16 to raise the load engagement means 20, 21 to a predetermined first vertical position p1. The climbing wheel 32 is thereby placed at a predetermined height h1 above the ground which is greater than the thickness of the base board 2.

When the load engagement means 20 has been moved to the first vertical position p1, the control unit 15 determines an operational parameter op. In this case the operational parameter is the traveled distance of the lift-truck from the time the pallet 2 was detected by the detection sensor 18. The traveled distance is compared to a predetermined value ov for the traveled distance. This value may be determined in advance since the position and viewing angle of the detection sensor is known.

Figure 5B:
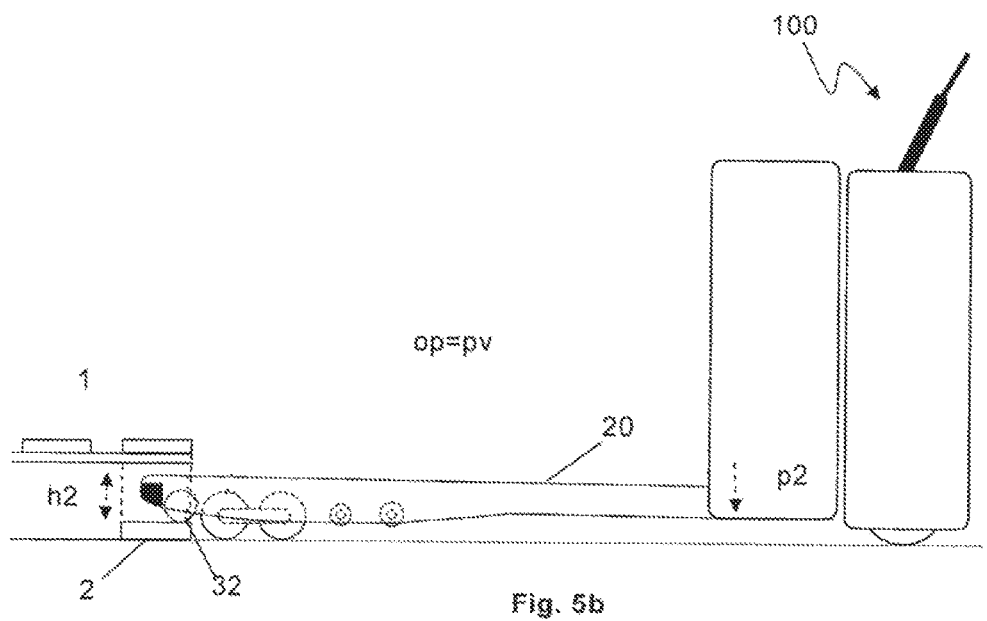

FIG. 5b shows the lift-truck 100 when the distance traveled by lift-truck is equal to the predetermined operational value ov for traveled distance. In this position, the forward end 22 of the load engagement means 20, 21 has entered in the space between the upper surface 3 and the base board 2 of the pallet 1 such that the climbing wheel 32 is above the base board 2. The control unit 15 determines that the operational parameter op (traveled distance) is equal to the predetermined operational value ov for traveled distance and controls the lifting/lowering unit 16 to lower the load engagement means 20, 21 to a predetermined position p2. The climbing wheel 32 is thereby placed at a predetermined height h2 above the ground which is equal to the thickness of the base board 2. As shown in FIG. 5b the climbing wheel 32 is resting on the base board 2 of the pallet 1. The movement of the load engagement means 20 through the pallet, lifting of the pallet and retracting the load engagement means from the pallet may follow as described under FIGS. 4a-4i.

It is appreciated that the control unit 15 also may be configured to move the load engagement means 20 to the first and the second vertical position p1 p2 on basis of a distance d measured by the detection sensor 18.

For example, when the detection sensor 18, in the form of a distance sensor, measures a first distance d1 (not shown) between the sensor and the base board 2 of the pallet, the load engagement means 20 may be moved to a first vertical position p1. As long as the sensor 18 continues to measure the distance d1, the control unit determines that the sensor 18 is above the base board 2 and maintains the vertical position p1. When the sensor 18 has moved beyond the base board 2 it will measure a second distance d2, which is the distance between the sensor and ground surface (not shown). In response to the second distance d2 the control unit 15 may lower the load engagement means 20 to the second vertical position p2 and place the climbing wheels 32 in contact with the base board 2. This requires that the distance between the sensor 18 and the climbing wheel 32 is appropriately selected.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of the embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

Although the above discussion discloses various exemplary embodiments, it should be apparent that those skilled in the art can make various modifications that will achieve some of the disclosed advantages without departing from the true scope of the disclosure.

The invention claimed is:

1. A lift-truck for moving a pallet, the pallet having a base board and being on a ground surface, the lift truck comprising:
   a first and a second lifting fork arm, wherein each lifting fork arm has a forward end and comprises at least one support wheel for supporting the lifting fork arm on the ground surface, and a climbing wheel for assisting the support wheel to roll up on the base board of the pallet;
   a lifting/lowering drive configured to raise or lower the first and the second lifting fork arm;
   a detection sensor arranged to detect the pallet located in front of the climbing wheel; and
   a control unit connected to the lifting/lowering drive and to the detection sensor, wherein the control unit is configured to:
      in response to a signal from the detection sensor, indicative of a detected pallet, control the lifting/lowering drive to move each lifting fork arm to place the climbing wheel at a first predetermined height over a ground surface;
      determine at least one operational parameter indicative of a movement of the lift-truck; and
      control the lifting/lowering drive to lower each lifting fork arm to place the climbing wheel at a second predetermined height over the ground surface when the operational parameter equals a predetermined operational value.

2. The lift-truck according to claim 1, wherein the detection sensor is a distance sensor arranged to measure a distance to the pallet in front of the climbing wheel.

3. The lift-truck according to claim 2, wherein the distance sensor is an ultrasonic sensor.

4. The lift-truck according to claim 2, wherein the control unit is configured to:
compare measured distances from the distance sensor with at least a first predetermined distance, and control the lifting/lowering drive to move each lifting fork arm to place the climbing wheel at the first predetermined height over the ground surface when a measured distance equals the first predetermined distance.

5. The lift-truck according to claim 1, wherein the operational parameter is traveled distance of the lift-truck or a combination of traveled time of the lift-truck and velocity of the lift-truck after detection of the pallet.

6. The lift-truck according to claim 1, wherein the operational parameter is a distance measured by the detection sensor.

7. The lift-truck according to claim 6, wherein the control unit is configured to compare measured distances from the detection sensor with at least a second predetermined distance, and control the lifting/lowering drive to move each lifting fork arm to place the climbing wheel at the second predetermined height over the ground surface when a measured distance equals the second predetermined distance.

8. The lift-truck according to claim 1, wherein the first predetermined height is greater than a thickness of the base board of a preselected pallet type.

9. The lift-truck according to claim 1, wherein the second predetermined height is equal to or less than a thickness of the base board of a preselected pallet type.

10. The lift-truck according to claim 1, further comprising a housing having a front, wherein the first and the second lifting fork arm extend from the front of the housing and wherein the detection sensor is arranged on the front of the housing.

11. The lift-truck according to claim 10, wherein the first and the second lifting fork arm are spaced apart and wherein the detection sensor is arranged between the first and the second lifting fork arm.

12. The lift-truck according to claim 1, wherein the detection sensor is arranged in a front end of at least one of the first or the second lifting fork arm.

13. The lift-truck according to claim 1, wherein the each lifting fork arm comprises a first auxiliary wheel arranged between the support wheel and a rear end of the corresponding lifting fork arm.

* * * * *